(12) United States Patent
Scanlon et al.

(10) Patent No.: US 10,089,565 B2
(45) Date of Patent: Oct. 2, 2018

(54) PERSONAL CARDS FORMED FROM METALS AND METAL ALLOYS

(71) Applicant: Card Limited, LLC, Lehi, UT (US)

(72) Inventors: Christopher James Scanlon, Lehi, UT (US); Jose Zambrano, Fort Lauderdale, FL (US)

(73) Assignee: AU Card, LLC, Lehi, UT (US)

( * ) Notice: Subject to any disclaimer, the term of this patent is extended or adjusted under 35 U.S.C. 154(b) by 284 days.

(21) Appl. No.: 14/262,523

(22) Filed: Apr. 25, 2014

(65) Prior Publication Data

US 2015/0069131 A1 Mar. 12, 2015

Related U.S. Application Data

(63) Continuation-in-part of application No. 14/022,014, filed on Sep. 9, 2013.

(51) Int. Cl.
| | |
|---|---|
| *G06K 19/00* | (2006.01) |
| *G06K 19/02* | (2006.01) |
| *G06K 19/04* | (2006.01) |
| *B42D 25/425* | (2014.01) |
| *B42D 25/43* | (2014.01) |
| *B42D 25/305* | (2014.01) |
| *B42D 25/369* | (2014.01) |
| *B42D 25/324* | (2014.01) |
| *B42D 25/373* | (2014.01) |
| *B42D 25/00* | (2014.01) |

(52) U.S. Cl.
CPC ............ *G06K 19/02* (2013.01); *B42D 25/00* (2014.10); *B42D 25/305* (2014.10); *B42D 25/324* (2014.10); *B42D 25/369* (2014.10); *B42D 25/373* (2014.10); *B42D 25/425* (2014.10); *B42D 25/43* (2014.10); *G06K 19/022* (2013.01); *G06K 19/042* (2013.01); *Y10T 29/49826* (2015.01)

(58) Field of Classification Search
CPC ... G06K 19/067; B42D 25/00; B42D 2033/24
USPC .................................................. 235/487–492
See application file for complete search history.

(56) References Cited

U.S. PATENT DOCUMENTS

| | | | |
|---|---|---|---|
| 4,931,629 A | 6/1990 | Frankfurt | |
| 5,169,155 A * | 12/1992 | Soules et al. | ................. 273/293 |
| 5,626,937 A | 5/1997 | Morikawa et al. | |
| 5,735,550 A | 4/1998 | Hinkle | |

(Continued)

FOREIGN PATENT DOCUMENTS

| | | |
|---|---|---|
| DE | 102005056348 A1 | 5/2007 |
| KR | 10-2010-0118379 | 11/2010 |

OTHER PUBLICATIONS

International Search Report, PCT/US2013/058812, 3 pages, dated Dec. 19, 2013.

(Continued)

*Primary Examiner* — Jamara Franklin
(74) *Attorney, Agent, or Firm* — Dorsey & Whitney LLP

(57) ABSTRACT

A transaction card is described. The transaction card includes a card body that is made from metal. The metal may be a precious metal alloy, such as gold. The transaction card includes a polished area and a contrasting area on the card body. The transaction card additionally includes information. At least a portion of the information is engraved into the polished area.

26 Claims, 14 Drawing Sheets

(56) References Cited

U.S. PATENT DOCUMENTS

| | | | |
|---|---|---|---|
| 6,025,283 A | 2/2000 | Roberts | |
| 7,398,917 B2 | 7/2008 | Aibazov et al. | |
| 8,490,866 B1 | 7/2013 | Aibazov | |
| 2006/0086802 A1* | 4/2006 | Tolkowsky | 235/487 |
| 2006/0102729 A1 | 5/2006 | Gandel et al. | |
| 2006/0249042 A1 | 11/2006 | Heim et al. | |
| 2008/0245865 A1 | 10/2008 | Mosteller | |
| 2009/0239034 A1* | 9/2009 | Lamb | B32B 38/06 428/141 |
| 2011/0031319 A1* | 2/2011 | Kiekhaefer et al. | 235/492 |
| 2011/0315781 A1 | 12/2011 | Varga et al. | |
| 2013/0091044 A1* | 4/2013 | Reed et al. | 705/35 |

OTHER PUBLICATIONS

English Abstract and English Machine Translation of Specification and Claims of KR10-2010-0118379, Nov. 5, 2010.
Supplementary European Search Report for corresponding European Patent Application No. 13834654, dated May 23, 2016.

\* cited by examiner

PERSONAL CARDS FORMED FROM METALS AND METAL ALLOYS

CROSS-REFERENCES TO RELATED APPLICATIONS

This present application for patent claims priority as a continuation-in-part of U.S. patent application Ser. No. 14/022,014 filed 9 Sep. 2013, and co-pending International Patent Application No. PCT/US2013/58812, filed 9 Sep. 2013, each of which are hereby incorporated by reference in their entirety.

BACKGROUND

The use of personal cards, such as transaction cards (e.g., bank card, credit card, debit card, etc.), identification cards (e.g., driver's licenses, membership identification cards, security badges, etc.), and the like, continues to increase. Personal cards may be used to identify a person, purchase something, check out a book, earn rewards, access exclusive benefits, share information, etc. Typically, personal cards are made from plastic (e.g., polyvinyl chloride (PVC)). Which has led to the idea of 'paying with plastic.'

SUMMARY

A transaction card is described. The transaction card includes a card body that is made from metal. The metal may be a precious metal alloy, such as gold. The card body has a polished area and a contrasting area. The transaction card additionally includes information. At least a portion of the information is engraved into the polished area.

In some embodiments, the polished area may include a high polish area. In one example, a high polish area is an area that has a high polish finish. In some cases, the metal may be a precious metal alloy.

In some embodiments, the polished area may include an account number panel and the information may include an account number. At least some portion of the account number may be engraved into the account number panel.

In some embodiments, the polished area may include a plurality of account number panels. The account number may be partitioned among the plurality of account number panels and may be engraved according to the partitioning.

In some embodiments, the polished area may include a cardholder name panel and the information may include a cardholder name. In such embodiments, the cardholder name may be engraved into the cardholder name panel.

In some embodiments, the polished area may include an expiration date panel and the information may include an expiration date. In such embodiments, the expiration date may be engraved into the expiration date panel.

In some embodiments, the polished area may include a card verification value panel and the information may include a card verification value. In such embodiments, the card verification value may be engraved into the card verification value panel.

In some embodiments, the polished area may include a signature panel and the information may include a cardholder signature. In such embodiments, the cardholder signature may be engraved into the signature panel.

In some embodiments, the polished area may include a serial number panel and the information may include a serial number. In such embodiments, the serial number may be engraved into the serial number panel.

In some embodiments, the polished area may include an additional title panel and the information may include an additional title. In such embodiments, the additional title may be engraved into the additional title panel.

In some embodiments, the polished area may include an issue date panel and the information may include an issue date. In such embodiments, the issue date may be engraved into the issue date panel.

In some embodiments, the polished area may include an expiration date panel and the information may include an expiration date. In such embodiments, the expiration date may be engraved into the expiration date panel.

In some embodiments, the polished area may include a bank disclosure panel and the information may include a bank disclosure. In such embodiments, the bank disclosure may be engraved into the bank disclosure panel.

In some embodiments, the transaction card may include a design. The design may be engraved into the card body. In some embodiments, the design may include a stone. The stone may be affixed to the card body. The stone may be affixed to the card body using a setting. The setting may be affixed to the card body.

In some embodiments, the polished area may have a surface roughness that is less than or equal to 1 micrometers roughness average ($R_a$). In some embodiments, the polished area may have a shininess that is equal to or exceeds 80 gloss units. In some cases, the difference in surface roughness between the surface roughness of the polished area and the surface roughness of the contrasting area may exceed 0.5 micrometers $R_a$. In some embodiments, the difference in shininess between the shininess of the polished area and the shininess of the contrasting area is at least 7 gloss units.

In some embodiments, the contrasting area may be an area that has a contrasting finish or a contrasting background design. The contrasting area may contrast with the polished area. For example, the reflectivity and/or the shininess of the contrasting area may contrast with the reflectivity and/or the shininess of the polished area. In one example, the background design may include a pattern. The pattern may be engraved into the card body.

In some embodiments, the transaction card may include a border. The border may substantially surround the contrasting area. In one example, the border may contrast with the contrasting area.

A method for creating a transaction card is also described. An area of the transaction card may be polished. The polished area may contrast with a contrasting area of the transaction card. Information may be engraved into the polished area.

A method for creating a transaction card is additionally described. A design may be engraved into the transaction card. A stone may be affixed to the transaction card.

In some embodiments, a setting may be affixed to the transaction card. The stone may be affixed to the transaction card via the setting. In some cases, the stone may be integrated into the engraved design.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
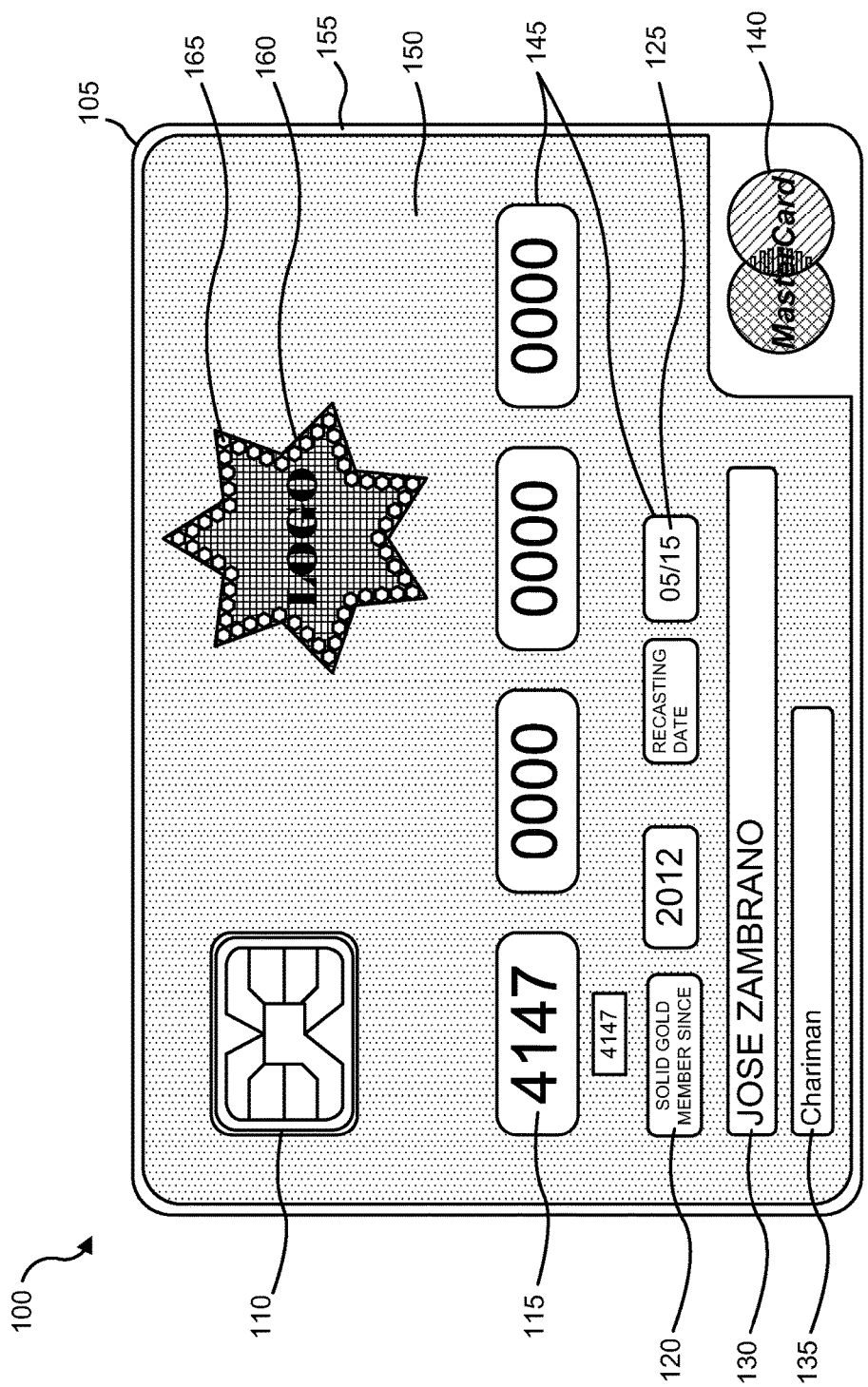
FIG. 1 is a block diagram illustrating one embodiment of the front side of a transaction card.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure relates to personal cards and more specifically, to personal cards that are substantially formed from metals (e.g., precious metals) or metal alloys (e.g., precious metal alloys). As used herein, the terms personal card and transaction card may be used interchangeably. Therefore, while the following description is described in terms of a transaction card, it is understood that the present disclosure relates to personal cards of any type, or combinations thereof. In some cases, the present description relates to the physical construction of a personal card (rather than a particular use of the personal card, for example).

In some cases the size and/or physical requirements of a transaction card may be defined by one or more standards. For example, a transaction card may conform with the ISO/IEC 7810 ID-1 standard as defined by the International Organization for Standardization (ISO). According to the ISO/IEC 7810 ID-1 standard, the size of a transaction card is 85.60 mm×53.98 mm with rounded corners having a radius of 2.88 mm to 3.48 mm. The ISO/IEC 7810 ID-1 standard additional specifies requirements for bending stiffness, flammability, toxicity, chemical resistance, dimensional stability, resistance to deterioration from exposure to heat and light, and durability. As described below, in some cases the described transaction card may conform to the ISO/IEC 7810 ID-1 standard.

In one embodiment, a transaction card may be formed from a single block of metal or metal alloy (precious metal or precious metal alloy, for example). For instance, a transaction card may be formed from a solid block of gold (e.g., 10 karat (K), 14K, 18K, 24K gold, etc.). Although the present disclosure describes a solid gold or solid gold alloy transaction card, it is understood that a transaction card could similarly be created from other precious metals or precious metal alloys (e.g., silver, palladium, platinum, etc.) or non-precious metals or non-precious metal alloys (e.g., aluminum, copper, titanium, bronze, etc.).

The transaction card may include information, one or more security features, an integrated circuit (e.g., EMV chip), and/or a magnetic strip. The information may include one or more alpha-numeric characters, one or more graphics (e.g., markings, logos, designs) and/or one or more identifiers. Examples of information include, a bank identification number, account number, primary account number, cardholder name, additional title (e.g., vanity name), issuing date, expiration (e.g., recasting) date, cardholder signature, card security code (e.g., card verification value (CVV)), cardholder agreements, service numbers, graphics, etc. The information may be embodied in the transaction card in any suitable way. In some cases, at least a portion of the information may be engraved into the metal transaction card, For example, at least a portion of the information may be engraved into polished areas (e.g., polished panels) on the metal transaction card. In at least one example, all of the information may be engraved into the metal card.

Referring now to the figures, FIG. 1 is a block diagram illustrating one embodiment of the front side 100 of a transaction card 105. The transaction card 105 includes a chip 110 (e.g., EMV chip), an account number 115, an issue date 120 (e.g., member since date), an expiration date 125 (e.g., a recasting date), a cardholder name 130, an additional title 135 (e.g., vanity title), and a card brand 140 (e.g., Visa®, MasterCard®, American Express®, etc.).

In one example, the account number 115 may correspond to a primary account number, which identifies the issuer of the card (via a Bank Identifier Number (BIN), for example) and the account number of the cardholder, and includes a check digit as an authentication device. The issue date 120 may indicate the date that the transaction card 105 was issued to the cardholder. The expiration date 125 (e.g., recasting date) may indicate the date that the card expires or the date that the card will be recast (refurbished or completely recreated, for example). The cardholder name 130 indicates the name of the cardholder (e.g., the person that was issued the transaction card 105). The additional title 135 may indicate an additional identifier for the cardholder.

In some embodiments, the account number 115, the issue date 120, the expiration date 125, the cardholder name 130, the additional title 135, and/or the card brand 140 may be engraved into a polished panel 145. In some embodiments, the polished panel may be an area of the transaction card that has been polished to create a smooth and shiny surface. For example, one or more of the polished panels 145 may be polished to create a polished (e.g., reflective, shiny) or a high polish finish (e.g., highly reflective, very shiny, mirror-like finish). Engraving information into a polished panel 145 may result in a highly durable and visually remarkable display of the information with added fraud prevention features.

In some cases, multiple pieces of information may be engraved into a single polished panel 145. In other cases, information may be partitioned into different polished panels 145. For example, the account number 115 (e.g., the 16 digit account number) may be partitioned into four distinct polished panels 145 to create four quartets. As illustrated, each of the account number 115, the issue date 120, the expiration date 125, the cardholder name 130, and the additional title 135 are engraved into polished panels 145. The size of a polished panel 145 may vary depending on the type of information and/or graphic that is being engraved into the polished panel 145, size/space constraints, and/or what may be visually appealing.

In some cases, the contrasting area 150 of the transaction card 150 may be finished with a satin/matte, brushed, Florentine, or hammered finish. Additionally or alternatively the contrasting area 150 may be milled and/or engraved to create a background design or pattern. The finish and/or pattern of the contrasting area 150 may visually contrast with the polished finish of the polished panels 145. For instance, the visual contrast may highlight the polished panels 145. In some cases, the finish and/or pattern of the contrasting area 150 may define a border 155 for the transaction card 150. In one example the border 155 may be finished differently from the contrasting area. For example, the border 155 may have a polished finish. In one example (as illustrated), the card brand 140 may be engraved into at least a portion of the border 155.

In some cases, the transaction card 105 may additionally include a front side graphic 160. The front side graphic 160 may be a design, a logo, a crest, a symbol, etc. The front side graphic 160 may be engraved into the transaction card 105. In some cases, engraving the front side graphic 160 into the transaction card may create graphic that is both durable and visually stunning. In one example, the front side graphic may be finished with a variety of finishes.

In some cases, the transaction card 105 may include one or more stones 165 (e.g., precious stones). For instance, the front side graphic 160 may be embellished with precious stones (e.g., diamonds, pearls, rubies, sapphires, emeralds, etc. The stones 165 may be affixed to the transaction card 105. For example, the stones 165 be set in a setting that is affixed (e.g., screwed in, glued) to the transaction card 105. It is understood that the stones 165 may be affixed to any portion of the transaction card 105 and are not limited to inclusion within the front side graphic 160.

Figure 2:
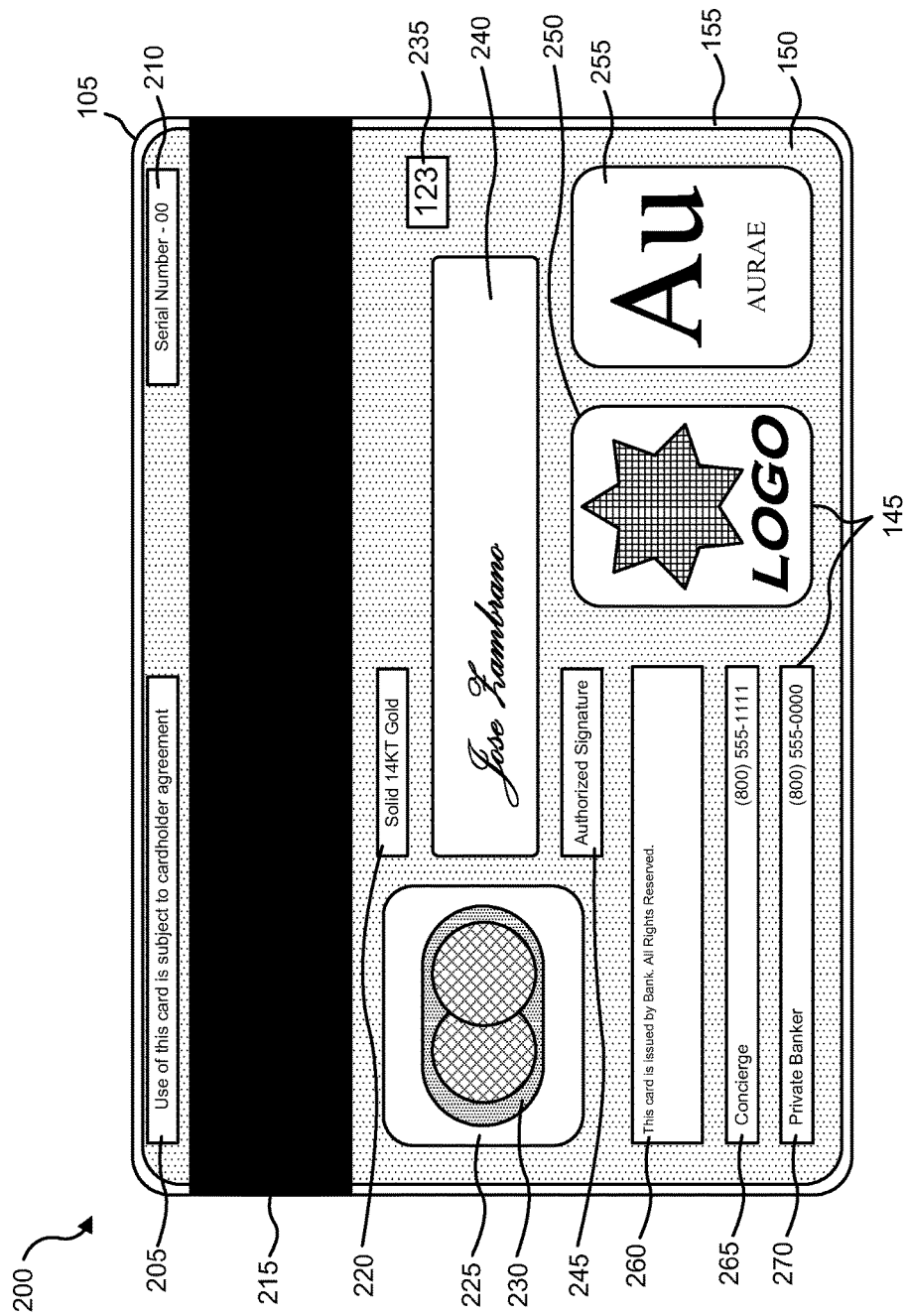
FIG. 2 is a block diagram illustrating one embodiment of the back side of the transaction card.

FIG. 2 is a block diagram illustrating one embodiment of the back side 200 of the transaction card 105. The back side 200 of the transaction card 105 may include information, a magnetic strip 215, and/or a security hologram 230. The magnetic strip 215 may allow for a machine (e.g., a point of sale device) to read magnetically stored information about the card. The security hologram 230 may indicate that the transaction card is authentic. The information may include a cardholder agreement clause 205, a serial number 210, an indication of the type of metal 220, a card security value 235, a cardholder signature 240, an authorized signature indication 245, a bank disclosure 260, and/or one or more service numbers (e.g., concierge number 265, private banker number 270, etc.).

The cardholder agreement clause 205 references the agreement that the cardholder agreed to for usage of the transaction card 105. The serial number 201 may be a unique number for each transaction card 105. In one example, each transaction card 105 is unique and is custom tailored to the cardholder, making the transaction card 105 an item of art as well as a transaction card 105. The serial number 210 may identify the transaction card 105. The serial number 210 may additionally indicate the creation sequence of the transaction card 105 and the exclusive history of the transaction card 105. In some cases, the serial number 210 may additionally, be used for tracking and/or insuring each transaction card 105.

The indication of the type of metal 220 may indicate the type of metal that the transaction card 105 is created from. In one example, the transaction card 105 is created from a single, solid block of metal or metal alloy, so that the indication of the type of metal 220 indicates the only materials the make up the card, aside from any chip 110, magnetic strip 215, security hologram 230, and/or stones 165 that may be affixed to the transaction card 105. The card security value 235 can be used as a security feature to verify that a card is present for virtual transactions (e.g., online or telephonic transactions). The cardholder signature 240 may be the authorized signature of the cardholder. The authorized signature indication 245 may indicate that the cardholder signature 240 is an authorized signature. The bank disclosure 260 may indicate who issued the card and/or information regarding the card issuer and/or bank. The concierge number 265 and the private banker number 270 may indicate service numbers for seeking help and/or for obtaining benefits.

As described previously, at least a portion of the information may be included in polished panels 145. For example, as illustrated, the a cardholder agreement clause 205, the serial number 210, an indication of the type of metal 220, a card security value 235, a cardholder signature 240, an authorized signature indication 245, a bank disclosure 260, and/or one or more service numbers (e.g., concierge number 265, private banker number 270, may be engraved into polished panels 145. In some cases, the security hologram 230 may be affixed (e.g., adhered, glued) to a (polished, for example) security panel 225. In one example, the security panel 225 may be finished to improve the bond between the security hologram 230 and the security panel 225.

In some embodiments, the transaction card 105 may additionally include a back side graphic 250 and a card creator graphic 255. In one example, the back side graphic 250 may be customized along with the front side graphic 160. In some embodiments, the card creator graphic 255 may indicate the brand or entity that created the transaction card 105. The back side graphic 250 and/or the card creator graphic 255 may be engraved into polished panels 145. The transaction card 105 may also include a contrasting area 150. As described previously, the contrasting area 150 of the transaction card 150 may be finished with a satin/matte, brushed, Florentine, or hammered finish. Additionally or alternatively the contrasting area 150 may be milled and/or engraved to create a background design or pattern. The finish and/or pattern of the contrasting area 150 may visually contrast with the polished finish of the polished panels 145. In some embodiments, a border 155 may also be included on the back side of the transaction card 105.

Figure 3:
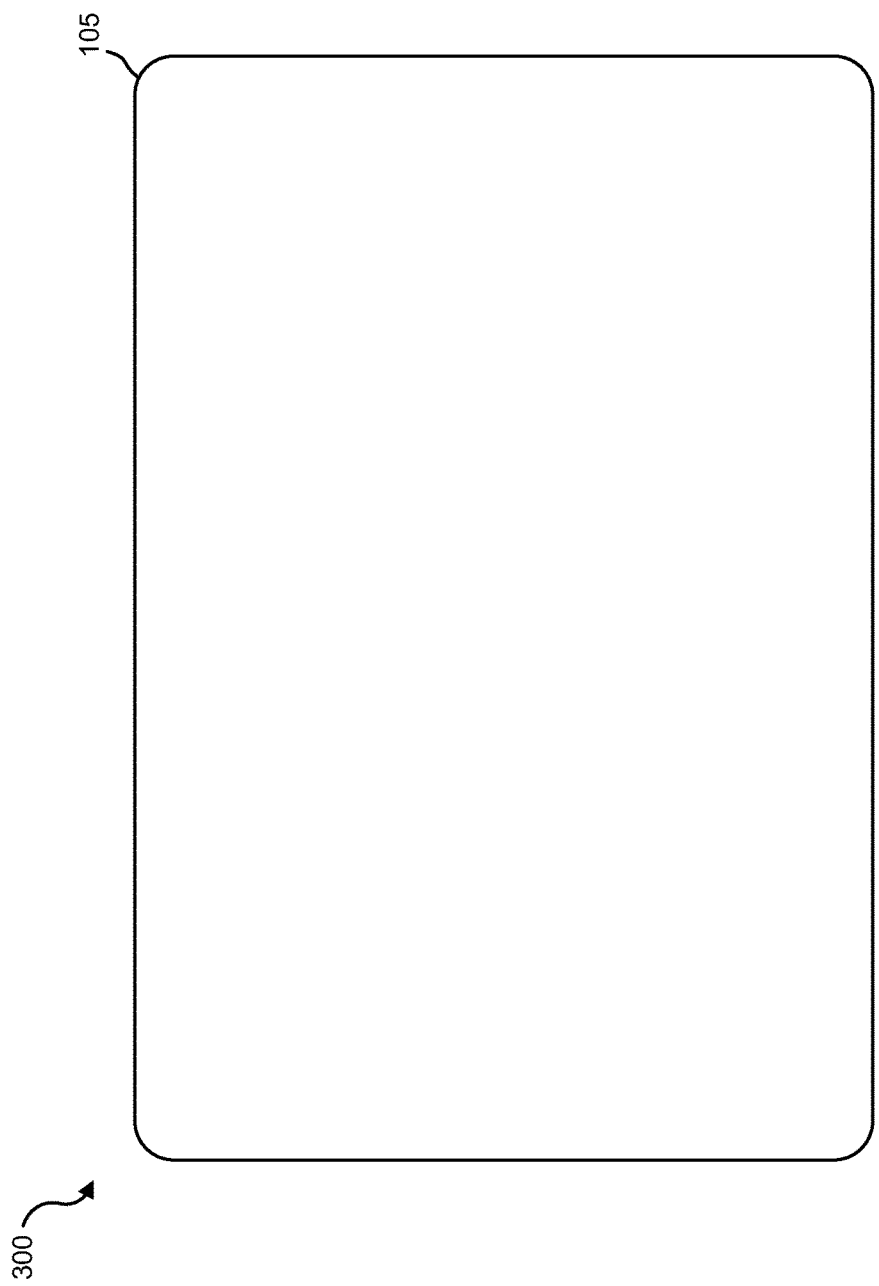
FIG. 3 is an example of the solid piece of metal that is used to create the transaction card.

FIG. 3 is an example of the solid piece of 300 metal that is used to create the transaction card 105. In one example, a solid piece of gold may be rolled, cut, and/or otherwise formed to create the initial block of gold that the transaction card 105 will be formed from. In some embodiments, the single block of gold (e.g., 14K gold) may be a 48 gram block of gold that is rolled, and cut to conform with size and shape requirements. For example, the solid block of gold is rolled and cut to conform with the ISO/IEC 7810 ID-1 standards. In one example, the solid piece of gold may be heated and tested for durability to ensure compliance with various standards (e.g., ISO/IEC 7810 ID-1 standards).

Figure 4:
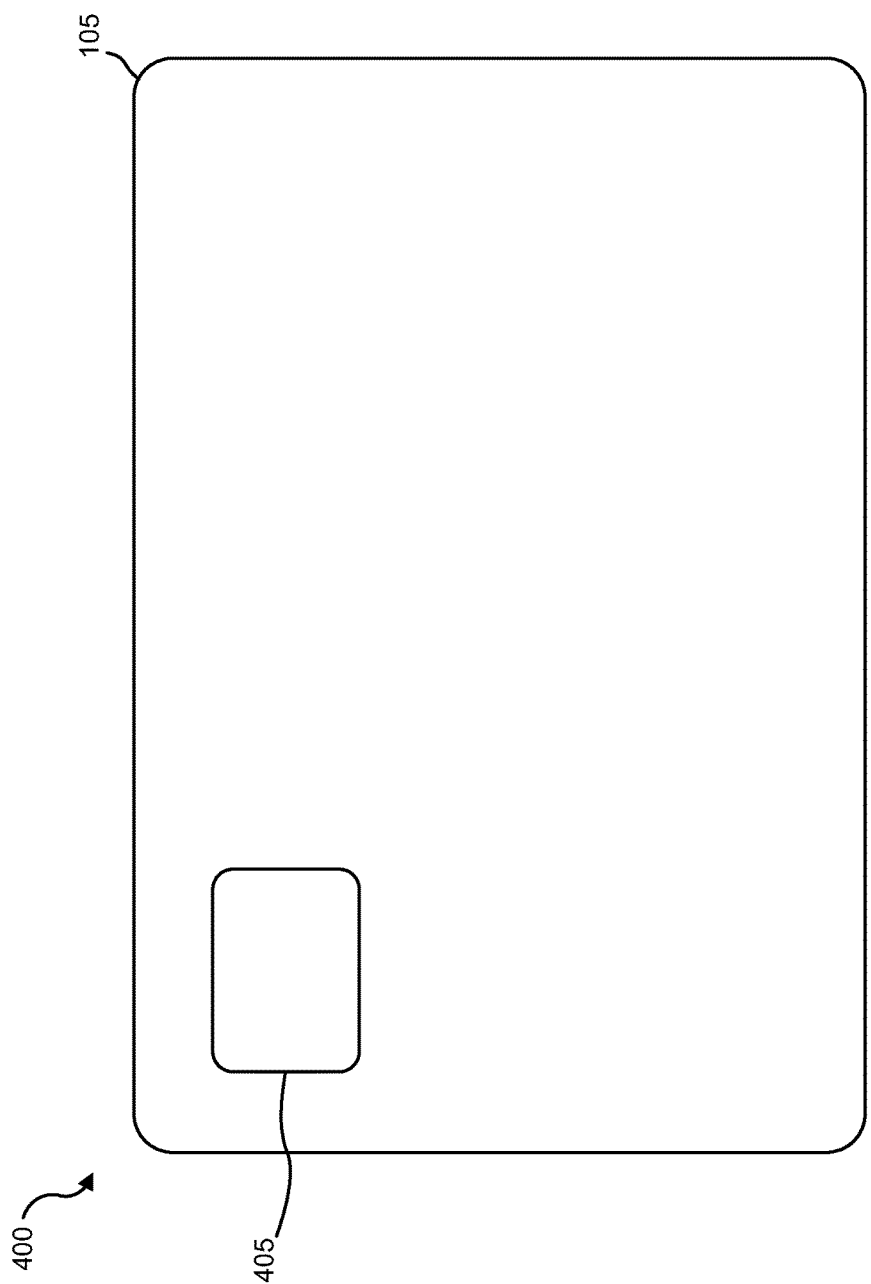
FIG. 4, the front side of the of the solid gold transaction card may be milled to create a depression for a chip to be inserted into.

Referring now to FIG. 4, the front side 400 of the of the solid gold transaction card 105 may be milled to create a depression 405 (e.g., cavity) for a chip (e.g., chip 110) to be inserted into. In one example, the depression 405 may be sized to allow for the chip to be seamlessly integrated into the transaction card (mounted so that it is flush with both the front surface of the transaction card 105 and flush with the sides of the depression 405, for example).

Figure 5:
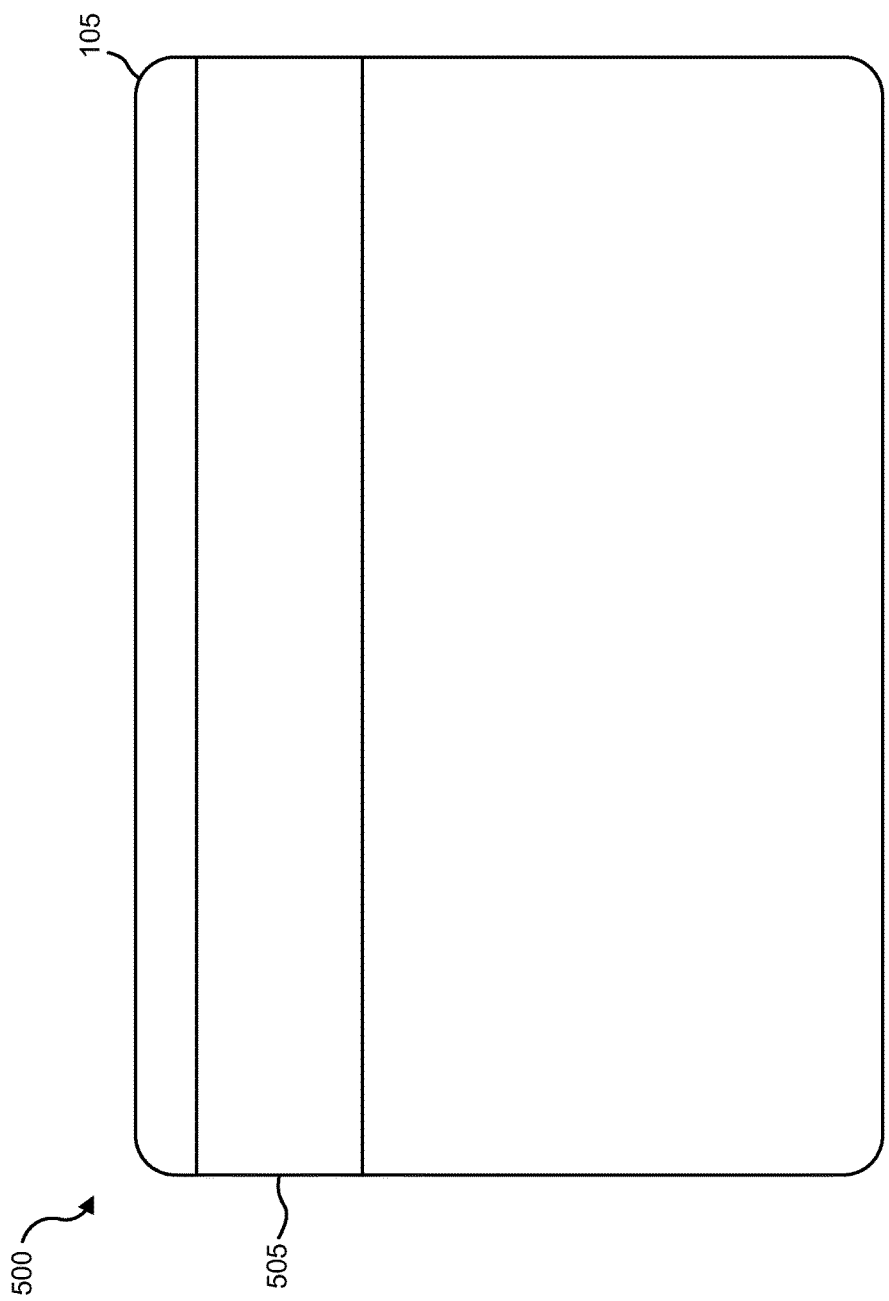
FIG. 5, the back side of the solid gold transaction card may be milled to create a slot for a magnetic strip to be inserted into.

Referring now to FIG. 5, the back side 500 of the solid gold transaction card 105 may be milled to create a slot 505 for a magnetic strip (e.g., magnetic strip 215) to be inserted into. In one example, the slot 505 may be sized to allow for the magnetic strip to be seamlessly integrated into the transaction card (mounted so that it is flush with both the back surface of the transaction card 105 and flush with the sides of the slot 505, for example).

Figure 6:
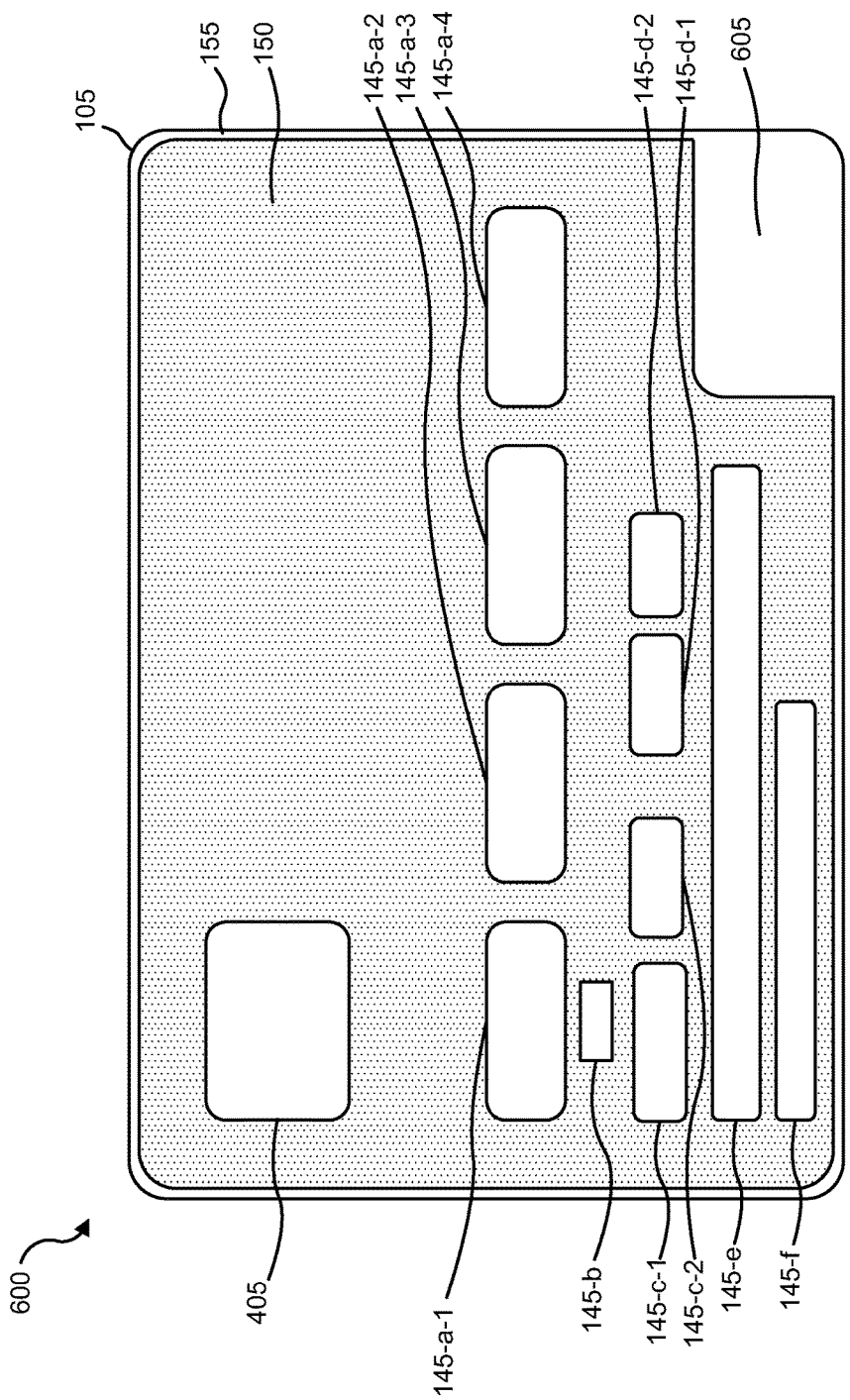
FIG. 6, the front side of the solid gold transaction card may be milled, engraved, and/or finished to create a background pattern in the contrasting area.

Referring now to FIG. 6, the front side 600 of the solid gold transaction card 105 may be milled, engraved, and/or finished to create a background pattern in the contrasting area 150. For example, a background pattern may be engraved into the contrasting area 150 of the solid gold transaction card 105. In one example, the background pattern may define the boundaries (by virtue of where the background pattern is not at, for example) of one or more polished panels 145 and/or a border 155. The border 155 may be finished using any of a variety of finishing techniques. In one example, the border 155 may be polished to create a polished finish. The polished panels 145 may be polished to create a polished finish (e.g., highly polished finish) in the polished panels 145. In some embodiments, the difference between the background pattern and the polished panels 145 may create visually contrasting panels on the transaction card 105.

In one example, the polished panels 145 may be polished to have a surface roughness that is less than or equal to 1 micrometers average roughness ($R_a$) (as measured by a scanning electron microscope, for example). For instance, according to one exemplary embodiment, the polished panels 145 may be polished to have a surface roughness that is 0.5 micrometers $R_a$, 0.1 micrometers $R_a$, etc. In some cases, a lower surface roughness corresponds with increased shininess (e.g., a higher gloss unit measurement). For example, polishing a polished panel 145 to surface roughness that is less than or equal to 1 micrometers $R_a$, may correspond with a shininess that is equal to or exceeds 80 gloss units (GU) (as measured by a gloss meter, for example).

In one example, a difference in surface roughness between the polished panels 145 and the contrasting area 150 may be greater than or equal to 0.5 micrometers $R_a$ (as measured by a scanning electron microscope, for example). In some embodiments, the average roughness (e.g., $R_a$) of the surface of the contrasting area 150 includes the roughness resulting from the contrasting finish or the contrasting background pattern. In some embodiments, the difference in surface roughness between the polished panels 145 and the contrasting area 150 may correspond to a difference in shininess (e.g. measured in gloss units) between the polished panels 145 and the contrasting area 150. In one example, the difference in shininess between the polished panels 145 and the contrasting area 150 may be equal to or exceed 7 gloss units (as measured by a gloss meter, at 20 degrees incidence, for example). In another example, the difference in shininess between the polished panels 145 and the contrasting area 150 may exceed 10 gloss units, 15 gloss units, etc. In some cases, the difference in surface roughness and/or the difference in shininess (e.g., measured in gloss units) creates the visual contrast between the polished panels 145 and the contrasting area 150.

In some cases, the contrast (e.g., the difference in surface roughness and/or the difference in shininess) between the contrasting area 150 and the polished panels 145 may draw attention to (e.g., highlight) the polished panels 145 (and the information that they contain, for example). In one example, the reflectivity and/or the shininess of the polished panels 145 may be greater than the reflectivity and/or shininess of the contrast area 150 (due to the difference in surface roughness, for example) so that the difference in reflectivity and/or shininess draws attention to the polished panels 145.

In some cases, the contrast area 150 provides additional fraud protection for the transaction card 105. For example, the type, style, and or parameters associated with the background finish or background pattern may be very difficult and/or expensive to duplicate. The added degree of difficulty and expense creates an increased barrier of entry for a counterfeiter, thereby protecting against fraudulent copying of the transaction card 105. In another example, the polished panels 145 and/or the contrast between the polished panels 145 and the contrasting area 150 may be very difficult to duplicate, thus protecting against fraudulent copying of the transaction card 105. For instance the contrast between how the light reflects from the polished panels 145 in contrast with how the light reflects from the contrasting area 150 may distinguish the transaction card 105 and may provide additional fraud protection from fraudulent copying of the transaction card 105. In some embodiments, the polishing of the polished panels 145 to create a high polish finish (to reduce the surface roughness in order to achieve the high polish finish, for example) may also protect against fraudulent copying of the transaction card 105 (due to the tools and/or effort required to create the high polish finish, for example). In another example, the polished panels 145 may prevent fraud because in a conventional copier/scanner or camera including a flash, the polished panels 145 may produce a bright mirror-image of the highly polished areas, resulting in a reflection of the flash or copier light source, thereby masking the information (e.g., the account number, cardholder name, card security value) in the bright mirror-image of the polished panels 145.

In some embodiments, there may be a quartet of polished panels 145-*a*-1-4 for an account number, a polished panel 145-*b* for at least a partial issuer identification number (IIN) or bank identification number (BIN), a set of polished panels 145-*c*-1-2 for issue date information, a set of polished panels 145-*d*-1-2 for expiration date information, a polished panel 145-*e* for the cardholder name, and/or a polished panel 145-*f* for an additional cardholder title. In some cases, a panel for the card brand 605 (that may or may not be part of the border 155) may be polished.

Figure 7:
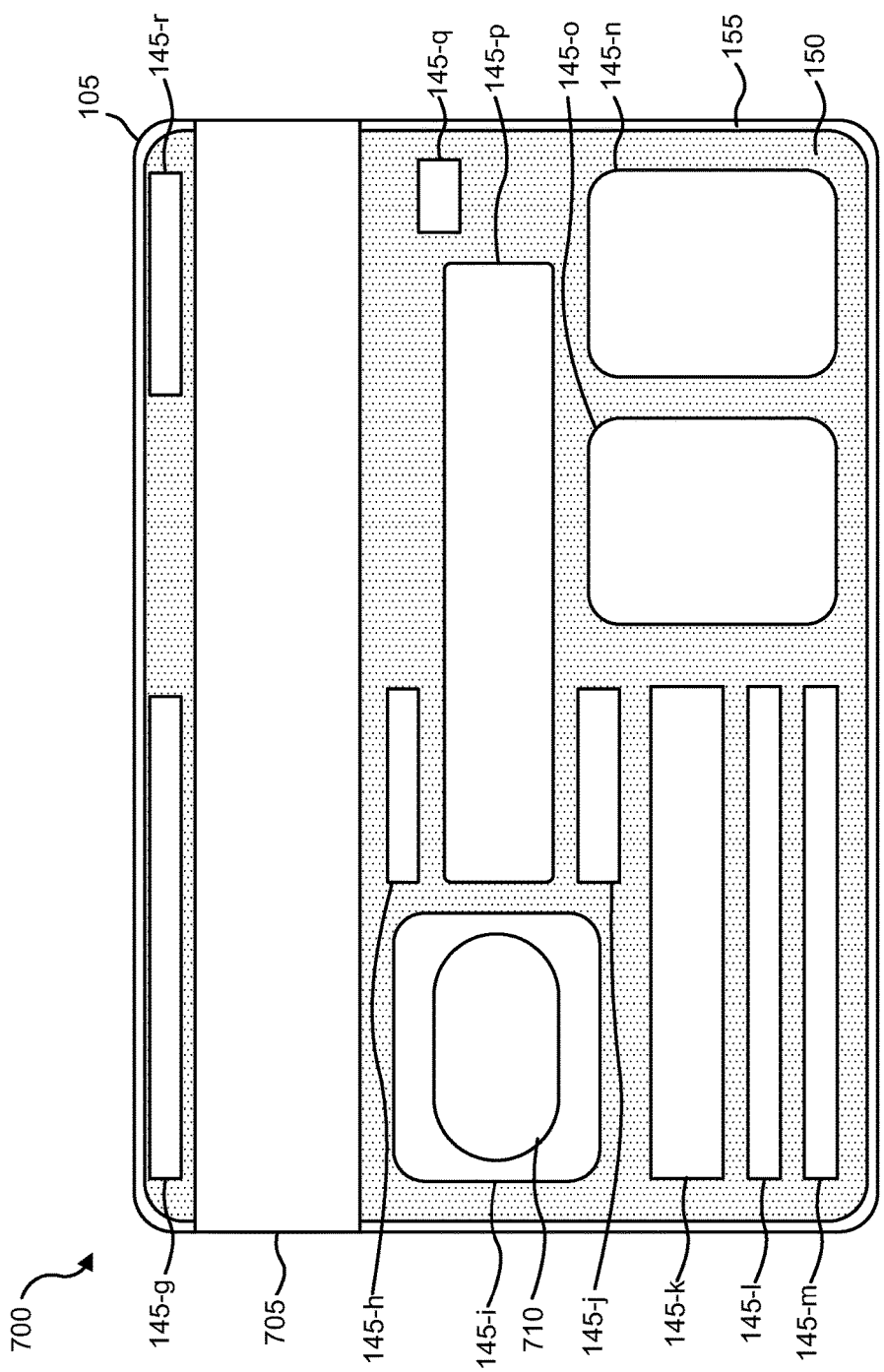
FIG. 7, the back side of the solid gold transaction card may be milled, engraved, and/or finished to create a background pattern in the contrasting area.

Referring now to FIG. 7, the back side 700 of the solid gold transaction card 105 may be milled, engraved, and/or finished to create a background pattern in the contrasting area 150. In some cases, the background pattern on the front side 600 of the transaction card 105 may be the same background pattern that is used on the back side 700 of the transaction card 105. In other cases, the background pattern on the front side 600 of the transaction card 105 may be different from the background pattern that is used on the back side 700 of the transaction card 105. As described previously, the background pattern may define one or more polished panels 145 and/or a border 155. Although both the front side 600 and the back side 700 of the transaction card 105 are illustrated as having a border 155, the border 155 may be optional on the front side 600 of the transaction card 105, the back side 700 of the transaction card 105, or both. In one example, the border 155 may be polished to create a polished finish. The polished panels 145 may be polished to create a polished finish (e.g., highly polished finish) in the polished panels 145. In some embodiments, the difference between the background pattern and the polished areas may create visually contrasting panels (e.g., polished panels 145) on the transaction card 105.

In some embodiments, the transaction card 105 may include a polished panel 145-*g* for a cardholder agreement clause, a polished panel 145-*h* for indicating the type of metal, a polished panel 145-*i* for a security hologram, a polished panel 145-*j* for an authorized signature indication, a polished panel 145-*k* for a bank disclosure, a polished panel 145-*l* for a concierge phone number, a polished panel 145-*m* for a private banker phone number, a polished panel 145-*n* for a card creator graphic, a polished panel 145-*o* for a back side graphic, a polished panel 145-*p* for a cardholder signature, a polished panel 145-*q* for a card security value, and/or a polished panel 145-*r* for a serial number. In some cases, the bonding surface 710 where the security hologram will be affixed to may be finished differently than the polished panel 145-*i* for the security hologram to ensure a better bonding surface between a security hologram and the bonding surface 710.

Figure 8:
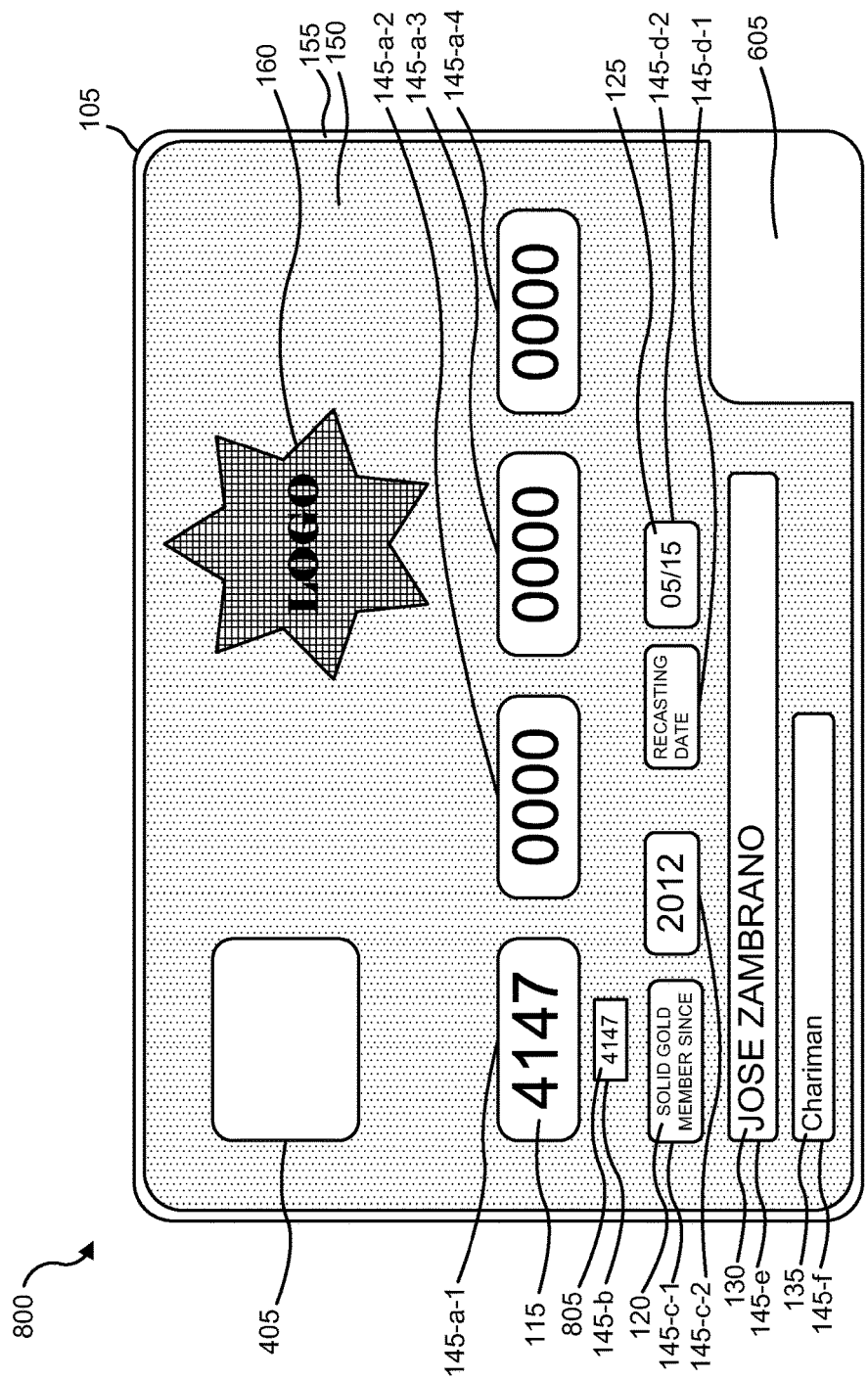
FIG. 8, the front side of the transaction card may be engraved to include information and graphics.

Referring now to FIG. 8, the front side 800 of the solid gold transaction card 105 may be engraved to include information and graphics. The account number 115 may be partitioned and engraved in quartet of polished panels 145-*a*-1-4 for the account number. For example, each polished panel 145-*a* may be engraved with four of the digits from the account number 115. In some cases, the first quartet 805 of the account number 115 may be engraved into the polished panel 145-*b*. The issued date 120 may be partitioned and engraved into the set of polished panel 145-*c*-1-2. For instance, an indicator indicating the member since information may be engraved into the first polished panel 145-*c*-1 and the date of membership (e.g., issuance) may be engraved into the second polished panel 145-*c*-2. The expiration (e.g., recasting) date 125 may be engraved into the polished panels 145-*d*-1-2 in a similar manner. Although some fields (e.g., the account number, issued date, expiration date) are shown as having multiple polished panels 145 and other fields are shown as having a single polished panel 145, it is understood that similar information may be engraved into more or less polished panels 145.

The cardholder name 130 may be engraved into the polished panel 145-*e* for the cardholder name. Similarly, the additional title 135 may be engraved into the polished panel 145-*f*. The front side graphic 160 may also be engraved into the transaction card 105. In some cases, the front side graphic 160 may be mapped to the transaction card 105 so that the area that will be used for the front side graphic 160 will not be included in the contrasting area 150.

In some embodiments, engraving information into a polished panel 145 may enhance the readability and/or the durability of the information. For example, engraving information into a polished panel 145 improves readability of the information due to the substantial contrast between the engraved area and the polished panel 145. Additionally, engraving information into the transaction card may enhance the durability of the information because the information is protected in recessed engraving (as opposed to being vulnerably exposed if the information were stamped or punched through, as is typically done for the account number, for example).

Figure 9:
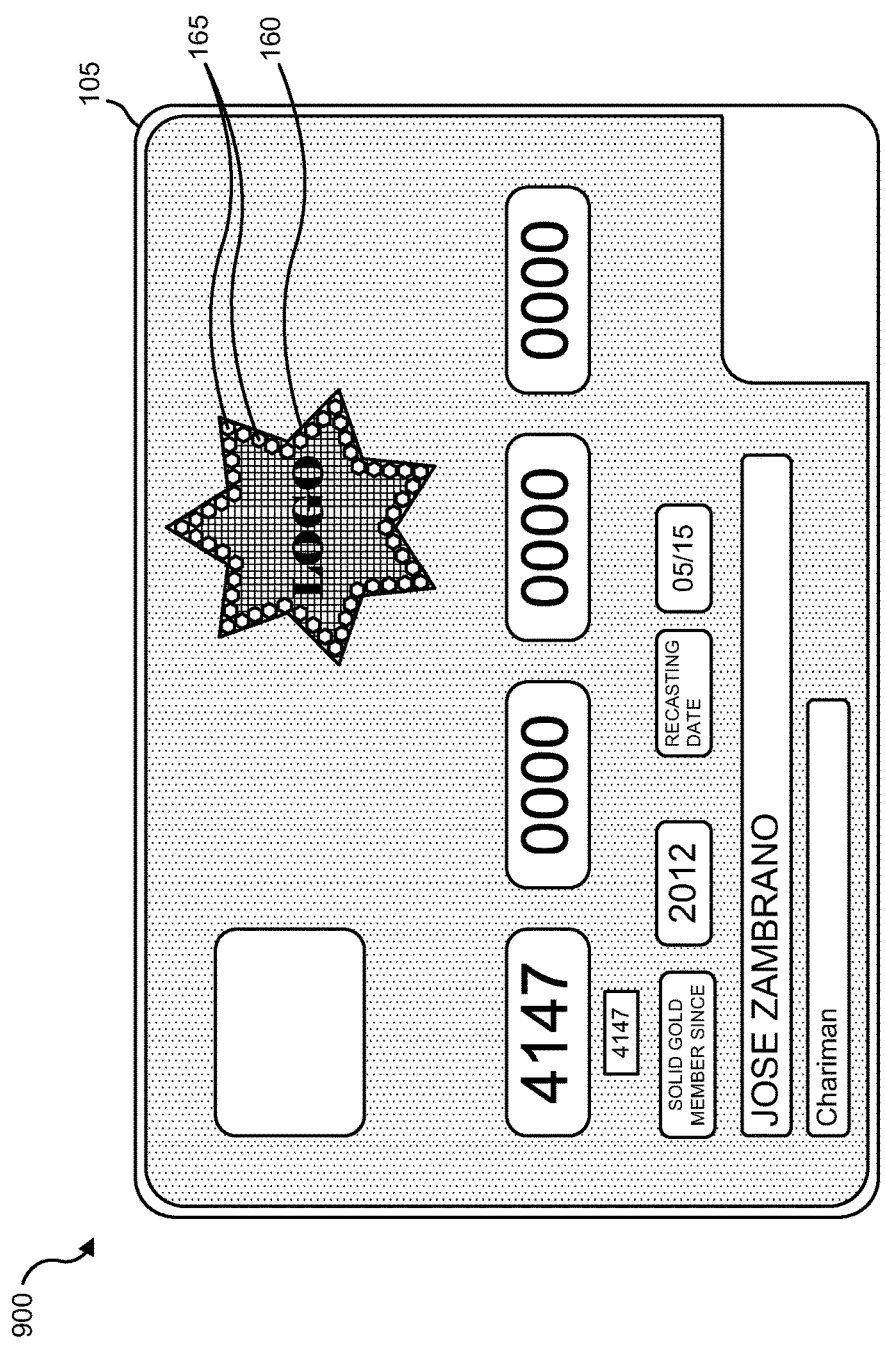
FIG. 9, one or more stones may be affixed to the front side of the transaction card.

Referring now to FIG. 9, one or more stones 165 may be affixed to the front side 900 of the transaction card 105. In some cases, one or more stones 165 may be affixed to the transaction card 105 to embellish the transaction card 105. In one example, as illustrated, one or more stones 165 may be affixed to the transaction card 105 to embellish the front side graphic 160. For instance, a plurality of stones 165 may be affixed to highlight one or more aspects of the front side graphic 160. In some cases, the stones are affixed to the transaction card via a setting (e.g., jewelry setting). For example, a setting may be affixed (e.g., screwed in or glued) to the transaction card 105 and the stone may be set and affixed in the setting. In some cases, a setting driven stone 165 may be durably affixed to the transaction card 105 so that the transaction card maintains conforms with one or more standards (e.g., ISO/IEC 7810 ID-1). Although not shown, stones may similarly be affixed to the back side of the transaction card 105.

Figure 10:
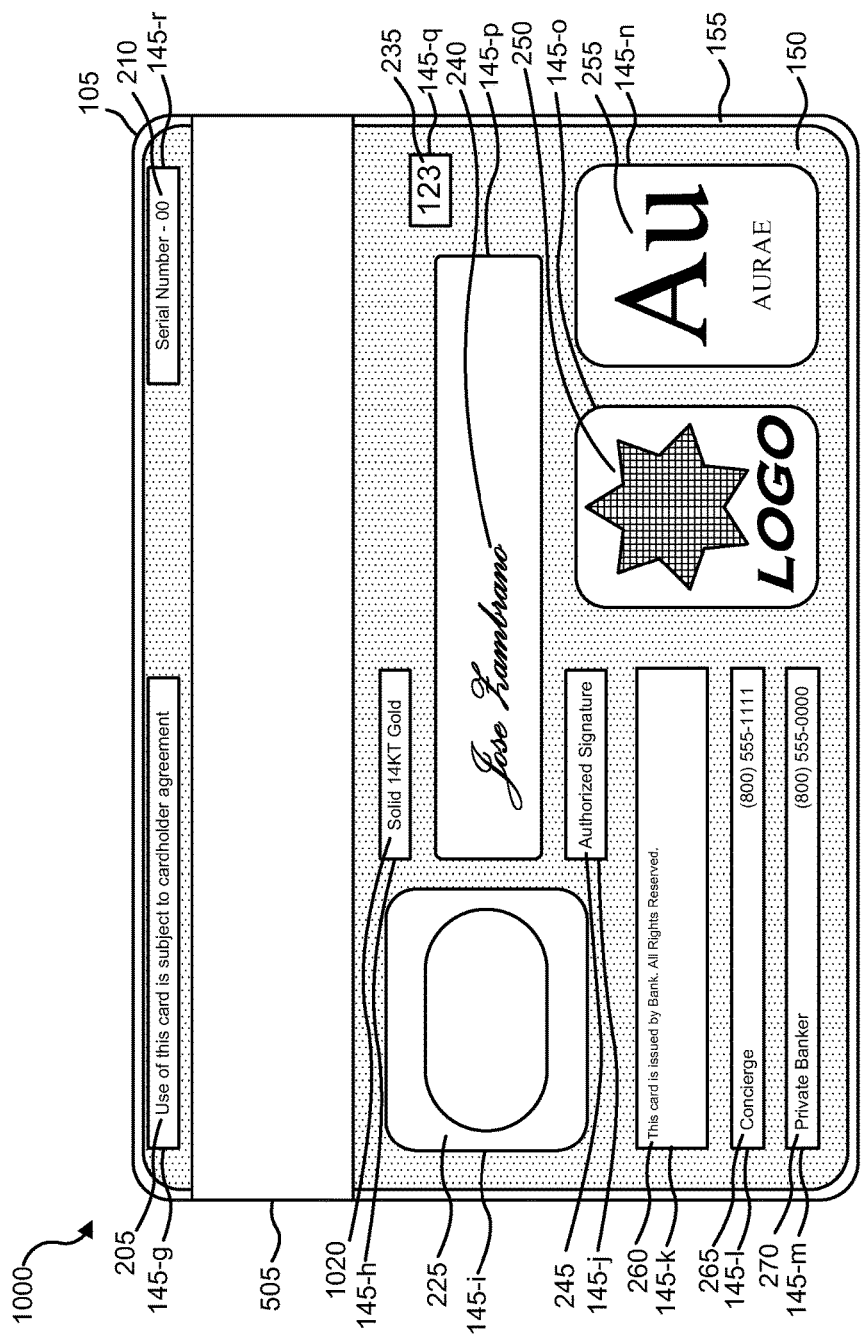
FIG. 10, the back side of the transaction card may be engraved to include information and graphics.

Referring now to FIG. 10, the back side 1000 of the solid gold transaction card 105 may be engraved to include information and graphics. The cardholder agreement clause 205 may be engraved into the polished panel 145-*g* for the cardholder agreement clause. Similarly, the serial number 210 may be engraved into the polished panel 145-*r* for the serial number. The indicator for the type of metal may be engraved in the polished panel 145-*h* for the type of metal indicator. The authorized signature indicator 245 may be engraved into the polished panel 145-*j* for the authorized signature indicator. The bank disclosure 260 may be engraved into the polished panel 145-*k* for the bank disclosure. The concierge number 265 may be engraved into the polished panel 145-1 for the concierge phone number. The private banker number 270 may be engraved into the polished panel 145-*m* for the private banker phone number.

The back side graphic 250 may be engraved into the polished panel 145-*o* for the back side graphic. The card creator graphic 255 may be engraved into the polished panel 145-*n* for the card creator graphic. Similarly, the cardholder signature 240 may be engraved into the polished panel 145-*p* for the cardholder signature. Additionally, the card security value 235 may be engraved into the polished panel 145-*q* for the card security value. In some cases, all of the information on the transaction card 105 may be engraved into the card.

Aside from any stones that have been affixed to the transaction card 105, the transaction card 105 may be a solid block of gold that has been milled, polished and/or engraved to create a transaction card blank. In some cases, the solid metal construction of the transaction card 105 eliminates the need for any protective coatings, layers, or sprays. As a result, the transaction card 105 may have no added coatings of any kind.

Figure 11:
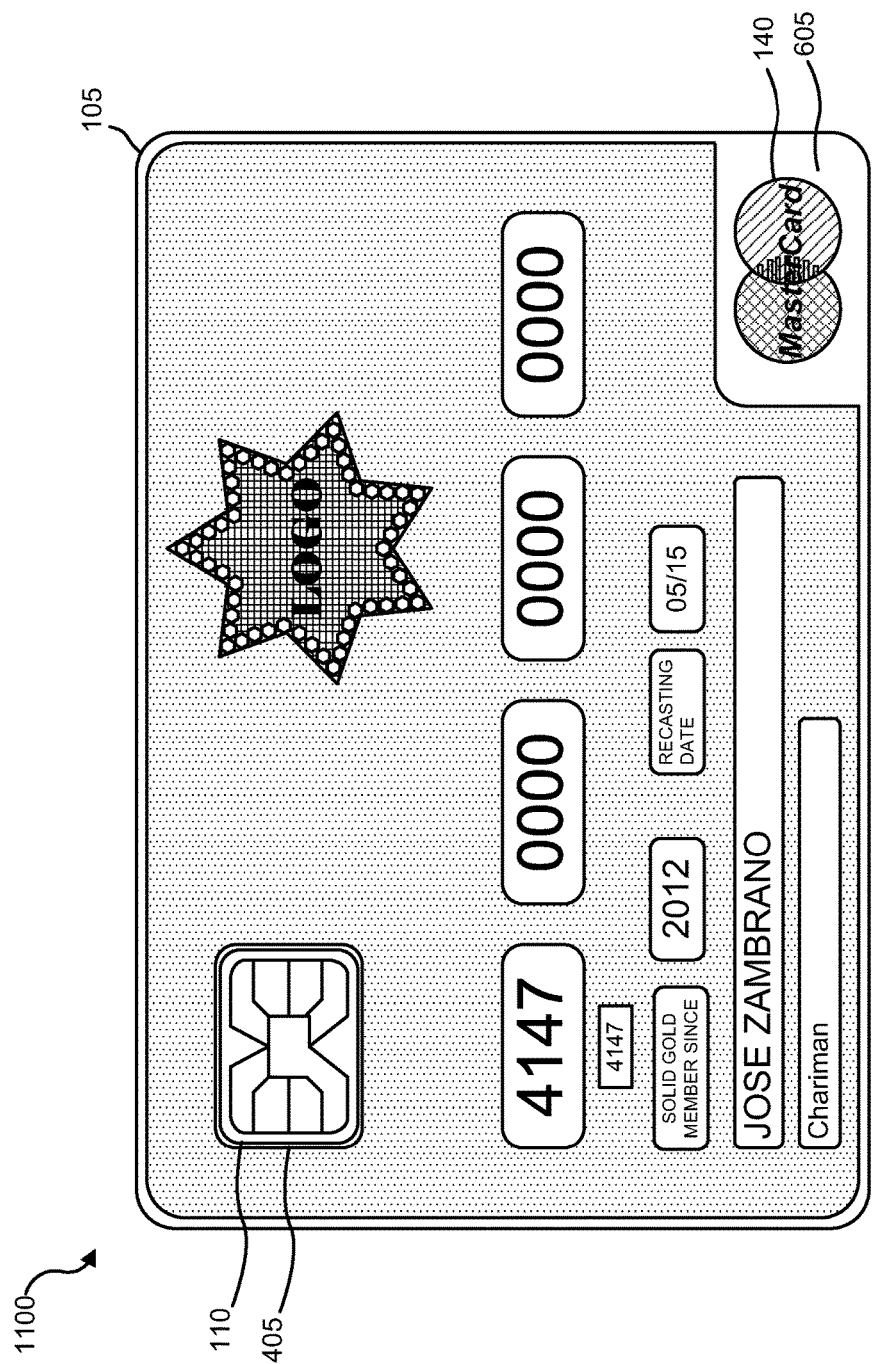
FIG. 11, the chip and the card brand may be added to the front side of the transaction card.

Referring now to FIG. 11, the chip 110 and the card brand 140 may be added to the front side 1000 of the transaction card 105. In some embodiments, the chip 110 may be glued or otherwise adhered to the transaction card 105. In some embodiments, the chip 110 may affixed within the depression 405 for the chip 110 so that the chip 110 is flush with and substantially integrated into the transaction card 105. In some cases, the card brand 140 may be engraved into the area for the card brand 605. Although mentioned separately, the engraving of the card brand 140 may occur at the same or different times as the engraving of the information into the transaction card 105.

Figure 12:
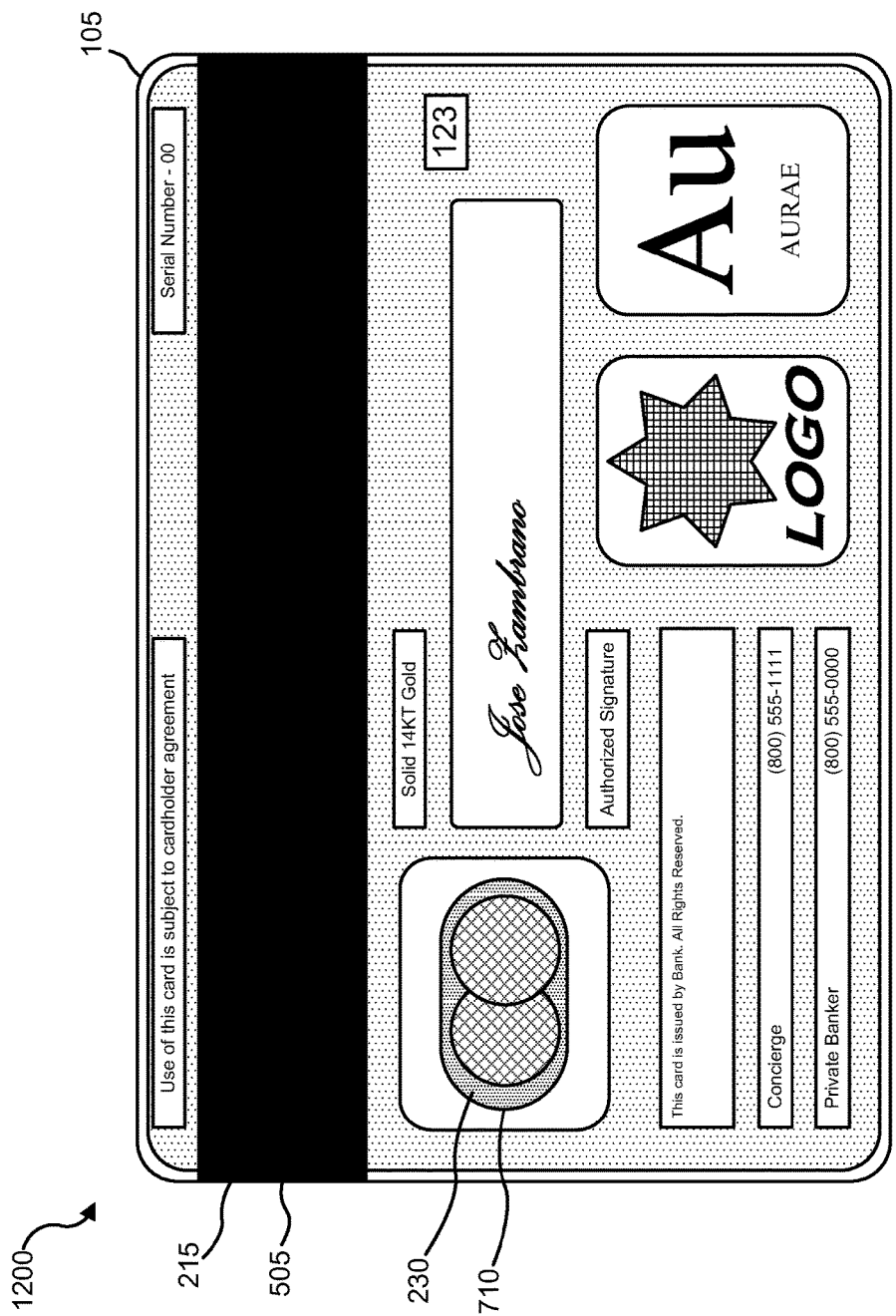
FIG. 12, the magnetic strip and the security hologram may be affixed to the back side of the transaction card.

Referring now to FIG. 12, the magnetic strip 215 and the security hologram 230 may be affixed to the back side 1200 of the transaction card 105. In some cases, an insulating material may be affixed (e.g., adhered) to the transaction card 105 (e.g., in the slot 505) prior to affixing the magnetic strip 215 to the metal transaction card 105. For example, a piece of plastic (e.g., PVC) that corresponds to the size of the magnetic strip 215 may be adhered to the transaction card 105 prior to the affixing (e.g., adhering) of the magnetic strip 215. The slot 505 may be sufficiently deep to accommodate the insulating material and the magnetic strip 215 so that the magnetic strip 215 is flush and substantially integrated (e.g., seamlessly integrated) into the transaction card 105. In one example, the security hologram 230 may be affixed to the binding area 710 prepared on the transaction card 105. For example, the security hologram 230 may be adhered (e.g., glued) to the binding area.

In some cases, the addition of the chip 110, the magnetic strip 215, the card brand 140, and/or the security hologram 230 may finalize the transaction card 105 for use. As described above, the transaction card 105 may be created from a solid block of metal, with the information being engraved into the transaction card 105. As a solid block of metal, additive layers and protective coatings are not needed. In some cases, the transaction card 105 does not include any printing. Additionally, a separate panel for signing a signature is no longer needed because the cardholder signature is engraved into the transaction card 105. In some embodiments, the solid block of metal may be milled, engraved, and/or finished into a transaction card without any printing, stamping, anodizing, protective coatings, and/or chemical treatments.

In some cases, the front side graphic 160, the back side graphic 250, the background pattern, and/or the border 155 may be completely customizable. For example, a cardholder may select the logo, design, or graphic that is engraved into the transaction card 105. As a solid metal transaction card 105, the transaction card 105 may have intrinsic value in addition to its value as a work of art and its value as a transaction card 105.

Figure 13:
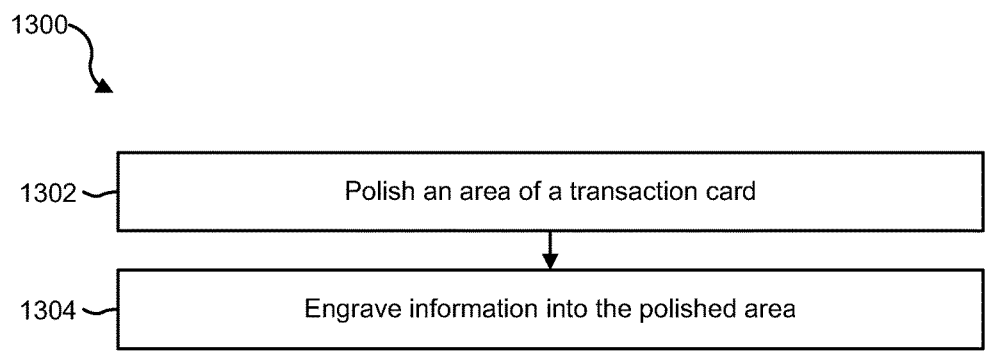
FIG. 13 is a flow diagram illustrating one example of a method for creating a transaction card.

FIG. 13 is a flow diagram illustrating one example of a method 1300 for creating a transaction card. In some configurations, the method 1300 may be performed by a computer having instructions stored on a non-transitory computer-readable storage medium, the instructions causing the processor to perform the steps of the method 1300.

At block 1302, an area of a transaction card may be polished. In one example the polished area may be further defined by a background pattern (e.g., a contrasting area). The background design or background pattern may border at least a portion of the polished area. In some cases, the polished area may be polished to a high polish finish. In some cases, the background design/pattern may contrast with the polished area because of the difference in reflectivity and/or shininess between the polished panels and the background pattern/design. In one example, the transaction card may be a solid block of metal (conforming with the ISO/IEC 7810 ID-1 standard, for example).

At block 1304, information may be engraved into the polished area. For example, as described above, the account number, cardholder name, additional title, serial number, cardholder signature, card security value, etc., may be engraved into the polished area.

Figure 14:
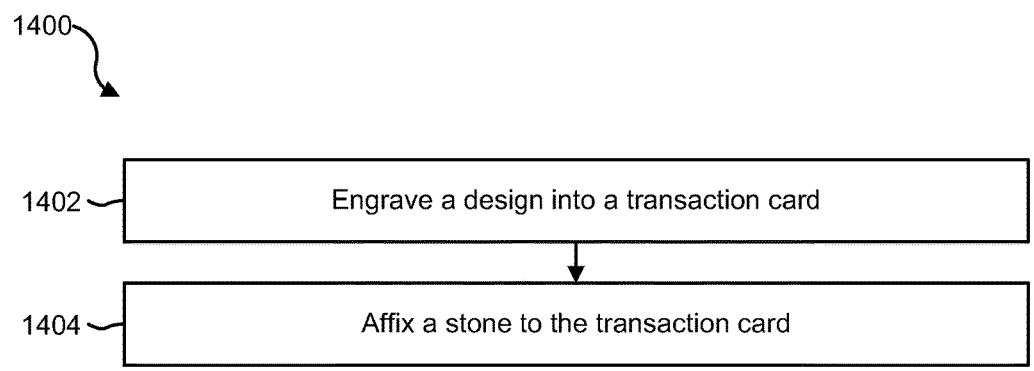
FIG. 14 is a flow diagram illustrating another example of a method for creating a transaction card.

FIG. 14 is a flow diagram illustrating another example of a method 1400 for creating a transaction card. In some configurations, the method 1400 may be performed by a computer having instructions stored on a non-transitory computer-readable storage medium, the instructions causing the processor to perform the steps of the method 1400.

At block 1402, a design may be engraved into a transaction card. For example a graphic, a logo, a crest, etc., may be engraved into the transaction card. In one example, the transaction card may be a solid block of metal (conforming with the ISO/IEC 7810 ID-1 standard, for example).

At block 1404, a stone may be affixed to the transaction card. For example, the stone may be affixed to a setting in the transaction card. In one example, the setting may be affixed to the transaction card. In some cases, the stone may be affixed to the transaction card to embellish the transaction card and/or one or more designs on the transaction card.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A transaction card comprising:
 a card body made from a single solid block of metal, the card body having a polished area and a contrasting area; and
 information, wherein at least some portion of the information is engraved into the polished area;
 wherein the contrasting area contrasts with the polished area; and
 wherein the difference in shininess between a shininess of the polished area and a shininess of the contrasting area is at least 7 gloss units.

2. The transaction card of claim 1, wherein the polished area comprises an area having a high polish finish.

3. The transaction card of claim 1, wherein the polished area comprises an account number panel, the information comprising an account number, wherein at least some portion of the account number is engraved into the account number panel.

4. The transaction card of claim 3, wherein the polished area comprises a plurality of account number panels, wherein the account number is partitioned among the plurality of account number panels and is engraved according to the partitioning.

5. The transaction card of claim 1, wherein the polished area comprises a cardholder name panel, the information comprising a cardholder name, wherein the cardholder name is engraved into the cardholder name panel.

6. The transaction card of claim 1, wherein the polished area comprises an expiration date panel, the information comprising an expiration date, wherein the expiration date is engraved into the expiration date panel.

7. The transaction card of claim 1, wherein the polished area comprises a card verification value panel, the information comprising a card verification value, wherein the card verification value is engraved into the card verification value panel.

8. The transaction card of claim 1, wherein the polished area comprises a signature panel, the information comprising a cardholder signature, wherein the cardholder signature is engraved into the signature panel.

9. The transaction card of claim 1, wherein the polished area comprises a serial number panel, the information comprising a serial number, wherein the serial number is engraved into the serial number panel.

10. The transaction card of claim 1, wherein the polished area comprises an additional title panel, the information comprising an additional title, wherein the additional title is engraved into the additional title panel.

11. The transaction card of claim 1, wherein the polished area comprises an issue date panel, the information comprising an issue date, wherein the issue date is engraved into the issue date panel.

12. The transaction card of claim 1, wherein the polished area comprises a bank disclosure panel, the information comprising a bank disclosure, wherein the bank disclosure is engraved into the bank disclosure panel.

13. The transaction card of claim 1, further comprising: a design, wherein the design is engraved into the card body.

14. The transaction card of claim 13, wherein the design comprises a stone, wherein the stone is affixed to the card body.

15. The transaction card of claim 14, wherein the stone is affixed to the card body using a setting, wherein the setting is affixed to the card body.

16. The transaction card of claim 1, wherein the contrasting area comprises an area having at least one of a contrasting finish or a background design, wherein the contrasting area contrasts with the polished area.

17. The transaction card of claim 16, wherein the background design comprises a pattern, wherein the pattern is engraved into the card body.

18. The transaction card of claim 16, further comprising: a border, wherein the border substantially surrounds the contrasting area, wherein the border contrasts with the contrasting area.

19. The transaction card of claim 1, wherein the metal comprises a precious metal alloy.

20. The transaction card of claim 1, wherein the polished area has a surface roughness of less than 1 micrometer roughness average ($R_a$).

21. The transaction card of claim 1, wherein the polished area has a shininess that is equal to or exceeds 80 gloss units.

22. The transaction card of claim 1, wherein a difference in surface roughness between a surface roughness of the polished area and a surface roughness of the contrasting area is at least 0.5 micrometers $R_a$.

23. A method for creating a transaction card, comprising:
polishing an area of the transaction card having a body being made of a single solid piece of metal, wherein the polished area contrasts with a contrasting area of the transaction card; and
engraving information into the polished area;
wherein the contrasting area contrasts with the polished area, the contrasting area having a different shininess than the polished area;
wherein the difference in shininess between a shininess of the polished area and a shininess of the contrasting area is at least 7 gloss units.

24. A method for creating a transaction card, comprising:
engraving a design into the transaction card, the transaction card being made of a single solid block of metal and a polished area and a contrasting area; and
affixing a stone to the transaction card;
wherein the contrasting area contrasts with the polished area, the contrasting area having a different shininess than the polished area;
wherein the difference in shininess between a shininess of the polished area and a shininess of the contrasting area is at least 7 gloss units.

25. The method of claim 24, further comprising:
affixing a setting to the transaction card, wherein the stone is affixed to the transaction card via the setting.

26. The method of claim 24, wherein the stone is integrated into the engraved design.

* * * * *